Fehle

(12) United States Patent
Naranjo Carvajal et al.

(10) Patent No.: US 10,597,504 B2
(45) Date of Patent: Mar. 24, 2020

(54) LOW TEMPERATURE PROCESS FOR INTEGRATING A POLYMERIC FOAM WITH A POLYMERIC BODY

(71) Applicants: Instituto de Capacitacion E Investigacion del Plastico y del Caucho, Medellin (CO); Plasticos Tecnicos Mexicanos S.A. de C.V., San Juan Del Rio, Queretaro (MX)

(72) Inventors: Alberto Naranjo Carvajal, Medellin (CO); Ivan Dario Lopez, Medellin (CO); Alexander Hernandez, Medellin (CO); Thomas Collin Mulholland, Medellin (CO); Jose Ricardo Pena, Queretaro (MX)

(73) Assignees: INSTITUTO DE CAPACITACION E INVESTIGACION DEL PLASTICO Y DEL CAUCHO, Medellin (CO); PLASTICOS TECNICOS MEXICANOS S.A. DE C.V., San Juan Del Rio, Queretaro (MX)

( * ) Notice: Subject to any disclaimer, the term of this patent is extended or adjusted under 35 U.S.C. 154(b) by 0 days.

(21) Appl. No.: 14/730,960

(22) Filed: Jun. 4, 2015

(65) Prior Publication Data
US 2015/0361239 A1 Dec. 17, 2015

Related U.S. Application Data

(60) Provisional application No. 62/011,296, filed on Jun. 12, 2014.

(51) Int. Cl.
*B29C 44/34* (2006.01)
*B29C 44/50* (2006.01)
*C08J 9/08* (2006.01)
*C08J 9/10* (2006.01)
*C08J 9/12* (2006.01)
*C08J 9/35* (2006.01)
*C08J 9/36* (2006.01)

(52) U.S. Cl.
CPC ........... *C08J 9/122* (2013.01); *B29C 44/3453* (2013.01); *C08J 9/35* (2013.01); *C08J 9/365* (2013.01); *C08J 2323/04* (2013.01); *C08J 2323/08* (2013.01); *C08J 2323/10* (2013.01)

(58) Field of Classification Search
CPC ... B29C 44/06; B29C 44/065; B29C 44/3453; C08J 2207/02; C08J 2201/032
See application file for complete search history.

(56) References Cited

U.S. PATENT DOCUMENTS

| | | | |
|---|---|---|---|
| 3,389,824 A | 6/1968 | Berchtold | |
| 5,665,285 A | 9/1997 | Hattori et al. | |
| 6,093,358 A | 7/2000 | Schiewe et al. | |
| 6,096,793 A * | 8/2000 | Lee | C08J 9/0061 521/134 |
| 6,295,787 B1 | 10/2001 | Lee | |
| 7,107,601 B2 | 9/2006 | Arai | |
| 7,182,897 B2 | 2/2007 | Arai | |
| 2005/0059747 A1* | 3/2005 | Berghmans | B29C 44/3453 521/50 |
| 2007/0213416 A1* | 9/2007 | Handa | C08J 9/127 521/56 |
| 2010/0198133 A1 | 8/2010 | Dougherty, Jr. | |
| 2012/0214890 A1* | 8/2012 | Senda | C08F 210/06 521/143 |
| 2014/0110491 A1 | 4/2014 | Roberts, Jr. | |

FOREIGN PATENT DOCUMENTS

| | | | |
|---|---|---|---|
| EP | 0647513 A2 | 4/1995 | |
| EP | 0765724 A2 | 4/1997 | |
| EP | 2318282 A1 | 5/2011 | |
| GB | 2021038 A * | 11/1979 | ............. B32B 27/08 |
| WO | 2006100517 A1 | 9/2006 | |
| WO | 2009158397 A1 | 12/2009 | |
| WO | 2010008264 A1 | 1/2010 | |

OTHER PUBLICATIONS

"Residual Stress". Accessed at www.me.umn.edu/~kstelson/research_sbp/sbp/zhang.html on Sep. 11, 2016. By K. Stelson.*
Residual stresses in injection molded products. A. Guevara-Morales U. Figueroa-Lopez J Mater Sci (2014) 49:4399-4415.*
Britton, Robin. Update on Mouldable Particle Foam Technology. Shrewsbury, Shropshire, GBR: Smithers Rapra, 2009. http://site.ebrary.com/lib/uspto/Doc?id=10326378&ppg=10 Copyright © 2009. Smithers Rapra. pp. 1-56.*
Machine translation of JP 2000-290420.*
Abbasi,M.; Khorasani, S.N.; Bagheri, R.; Esfahani, J.M. "Microcellular Foaming of Low-Density Polyethylene Using Nano-CaCO3 as a Nucleating Agent" Polymer Composites; Nov. 2011; 32; 11. pp. 1718-1725 (Year: 2011).*
C. Rauwendaal. "New screw design for cooling extruders" Plastics, Rubbers and Composites 2004 vol. 33 No. 9/10 397-399. (Year: 2004).*
N. Chen, et al; Influence of crosslinking on the foaming behavior of ethylene-vinyl acetate (EVA) using . . . ; ANTEC 2011; pp. 2695-2699.

(Continued)

*Primary Examiner* — Kara B Boyle
(74) *Attorney, Agent, or Firm* — Lucas & Mercanti, LLP

(57) ABSTRACT

A low temperature process which comprises several steps to integrate polymeric foams with at least one polymeric body in order to obtain a final body with improved properties is provided; the process being performed at a low temperature in order to avoid deformations in the polymeric body which compromise the functionality and other properties of the final body. The process comprises the steps of selecting the materials involved to guarantee the adhesion between them, the processability, their use and/or recycling, among other properties; impregnating the polymeric material to be foamed with a gas; generating the foam; and integrating the foam with the at least one polymeric body.

4 Claims, 15 Drawing Sheets

(56) References Cited

OTHER PUBLICATIONS

J. Lee, et al; A novel foam injection molding process using gas-laden pellets; 5 pages.
Da-Chao Li, et al; Foaming of linear isotactic polypropylene based on its non-isothermal crystallization behaviors . . . ; The Journal of Supercritical Fluids; vol. 60; 2011; pp. 89-97.
W. Michaeli, et al; Effects of the foam morphology in the mechanical properties of injection molded thermoplastic foams; ANTEC 2008; pp. 1024-1028.

* cited by examiner

LOW TEMPERATURE PROCESS FOR INTEGRATING A POLYMERIC FOAM WITH A POLYMERIC BODY

CROSS REFERENCE TO RELATED APPLICATION

This application claims the benefit of U.S. Provisional Patent Application No. 62/011,296, filed on Jun. 12, 2014, application which is incorporated herein in its entirety for all purposes.

TECHNICAL FIELD

The present invention relates to polymeric material technology and the manufacture of polymeric articles, wherein the integration of foam is desirable in order to reduce weight and to improve the mechanical, thermal insulation and acoustical insulation properties, among others, without compromising the functionality of the product, with low investment requirements, and allowing the reuse and/or recycling of the product.

BACKGROUND

Currently, some structures are industrially manufactured without foaming, for example, crates for bottled beverages, which then have foam integrated into existing cavities in order to reduce the weight of the structure, compared to a solid structure, and improve its impact resistance, without damaging the functionality, stack-ability and mechanical stability.

For said process of filling structures with foam, the steps defined in WO2010008264 are followed. This document refers to a process for producing molded plastic articles with thickened and reinforced walls, where the process combines conventional plastic molding techniques and comprises the steps of: designing a plastic article with at least one cavity or hollow area to be filled with a thermoplastic reinforcing material and which should have at least one injection gate; pre-molding the plastic article using a conventional molding process; injecting a thermoplastic material with a foaming agent through the injection gate using a low pressure injection machine; removing the product or plastic article from the low pressure injection machine; and, cooling the manufactured product in a storage area.

Following the steps indicated in the document WO2010008264, a High Density Polyethylene (HDPE) is used, with a melt flow index (MFI) of 8 grams per 10 minutes at a temperature of 190° C. with a weight of 2.16 kg which is injection molded. After manufacturing the un-foamed structure, a foamed polymer material, Linear Low Density Polyethylene (LLDPE), with a MFI of approximately 65 g/10 min (190/2.16), is injected into the structure. The injection molding processing temperature of the foamed material is approximately 150° C. The foam is generated with an endothermic chemical foaming agent, commercially available as Microcell® 303 from Momentum International GmbH.

The process defined in the document WO2010008264, features the problem that the injection of the foamed material must be done at an elevated temperature (more than 130° C. for the LLDPE) which liberates the residual stresses in the un-foamed structure, deforming said structure, which is an undesirable effect because it compromises the stack-ability, the mechanical stability, and the functionality of said structure. This problem is currently addressed by modifying the injection mold geometry to compensate for the deformations. However, this solution is inadequate, since it implies a process of trial and error of offsetting the deformations of the final structure to the mold cavity shape, increasing cost and time of development.

Currently, there exist many known processes and methods in the state of the art for the foaming of a polymer and its later application within another polymeric material.

One such solution in the state of the art is filling the cavities of the structure with chemical components in order to obtain thermoset foam that reacts at a temperature sufficiently low such that deformations in the structure are not produced. The document U.S. Pat. No. 3,389,824A discloses an example of the use of this solution for the construction of a cooler utilizing polyurethane as the foamed material. This method is commonly used in current fabrication techniques, but it creates enormous difficulties with the recycling of the polymeric structure because the thermoset foam cannot be melted. Other examples are presented in the documents U.S. Pat. Nos. 6,093,358 and 6,295,787 where a thermoset expandable material is used to fill the cavities of a plastic part.

Another solution available in the state of the art is integrating the foamed material with the un-foamed structure in the same mold wherein the structure is manufactured, said process being known in the art as foam overmolding. An example of this solution is disclosed in the document EP 2318282 A1, in which a rigid preform is overmolded with polymeric foam to later obtain, through a blow molding process, a container with a foamed layer. The pressurized mixing of the melted polymer to be foamed with a gas in the supercritical state is a technique commonly used to obtain thermoplastic foams that can be used to fabricate mono-component or overmolded multicomponent structures. Said mixture generates the foam when it is submitted to a low pressure condition. One example of this foaming technology is presented in the document US 20100198133. The principle disadvantage of the use of these overmolding and foaming technologies is the high investment cost in processing equipment and in mold technology.

Another solution available in the state of the art is the filling of part cavities with expandable polymeric beads. An example of this solution is described in the document US 20140110491, where a plastic structural article cavity is filled with a steam expandable thermoplastic polymer beads, when they are expanded, the cavity is filled. The materials of the beads and the structural article are of a similar polymer, enabling the recycling. However, the adhesion between the materials may be compromised, constraining the invention to closed cavity geometries. A similar solution is presented in the document EP 0647513. Another example is presented in the document U.S. Pat. No. 5,665,285, where a molded foam article is integrating with a polymeric skin using the blow molding method and expandable beads for foaming. This solution requires that the expandable beads are introduced in the hollow cavity prior to cooling.

One of the steps of the invention described in the present document is exposing the polymer which will be foamed in its solid state to a high pressure gas. This technique has been a part of various disclosures, but they are not intended for the low temperature integration of polymeric foam with polymeric bodies for obtaining a final structure with improved properties, without deforming the polymeric body, in order to guarantee the functionality and other properties of the final structure.

One of said disclosures is the document U.S. Pat. No. 7,107,601 which divulges a method for manufacturing an anti-vibration device which comprises the steps of: saturating a resin material with an inert gas through adjusting the pressure and the quantity of inert gas; molding a product in which the number, form, and shape of the gas cells are adjusted by controlling the injection pressure, injection velocity, shot size, holding pressure, cooling gradient and the cooling time.

Another document related to this technology is U.S. Pat. No. 7,182,897 which teaches a method for storing a material after it has been saturated, wherein the material is saturated at a pressure not less than 4 MPa and a defined temperature. Depending on the type of material, the time, the pressure and the saturation temperatures, the storage conditions are defined.

The document EP0765724 discloses a method for extruding plastic foams while reducing the viscosity by means of a gas. In this process, the material in granule or powder form is fed to a gas absorption apparatus, where it is charged with gas under a defined pressure and temperature and later passes through an extrusion process.

The state of the art is plenty of documents that describe the contact of polymer pellets with a gas in order to produce bead foams. For example, Li et al use a high pressure vessel to impregnate iPP polymer with $N_2$ and $CO_2$. The vessel is heated in order to foam the material. Chen et al. use a foaming chamber to prepare EVA foam samples using $CO_2$ as blowing agent. When the material is heated in the vessel and the pressure is released, the foaming process occurs.

The state of the art reports several studies of foam morphology and mechanical properties using injection molding to produce the foamed sampled test, where the polymer pellets were previously impregnated with a physical agent. An example is presented by Florez, where polycarbonate pellets are placed in contact with $CO_2$ at high pressures for more than 20 hours, then, the material is injected to obtain the samples.

Finally, the PCT application WO2006100517 discloses a process for introducing a gas into a polymer which comprises the steps of exposing a first polymer to a gas at a temperature greater than the room temperature, where this step is carried out at a temperature from the glass transition temperature to the crystal melting temperature for a semicrystalline material or below the glass transition temperature for an amorphous material. The polymer is melted to produce a foamed article.

In accordance with the previous information, it is clear to those skilled in the art that the existing documents do not offer an adequate solution to the problem raised in the present invention, since in most of the cases, the process for integrating the foam is carried out at a temperature greater than the temperature at which residual stresses are liberated in the un-foamed polymeric body, which in turn causes the final structure to be deformed and compromised. In other cases, the recyclability is negatively affected or large investments in equipment and mold technology are required.

Thus, there exists a need in the state of the art for designing a process or method for integrating a polymeric foam with an un-foamed polymeric structure at low temperatures to obtain a final structure, which is to say, at temperatures lower than the temperature at which residual stresses are liberated in the un-foamed polymeric structure, with the object of maintaining the physical properties of said structure and being suitable for multiple applications. Additionally, a process that does not require large investments in equipment and mold technology and does not affect the recyclability of the final structure is needed for future applications.

BRIEF DESCRIPTION OF THE DRAWINGS

The present invention is more precisely defined by the appended drawings, which do not limit the scope of the invention defined in claims, in which:

DETAILED DESCRIPTION OF THE INVENTION

Figure 1:
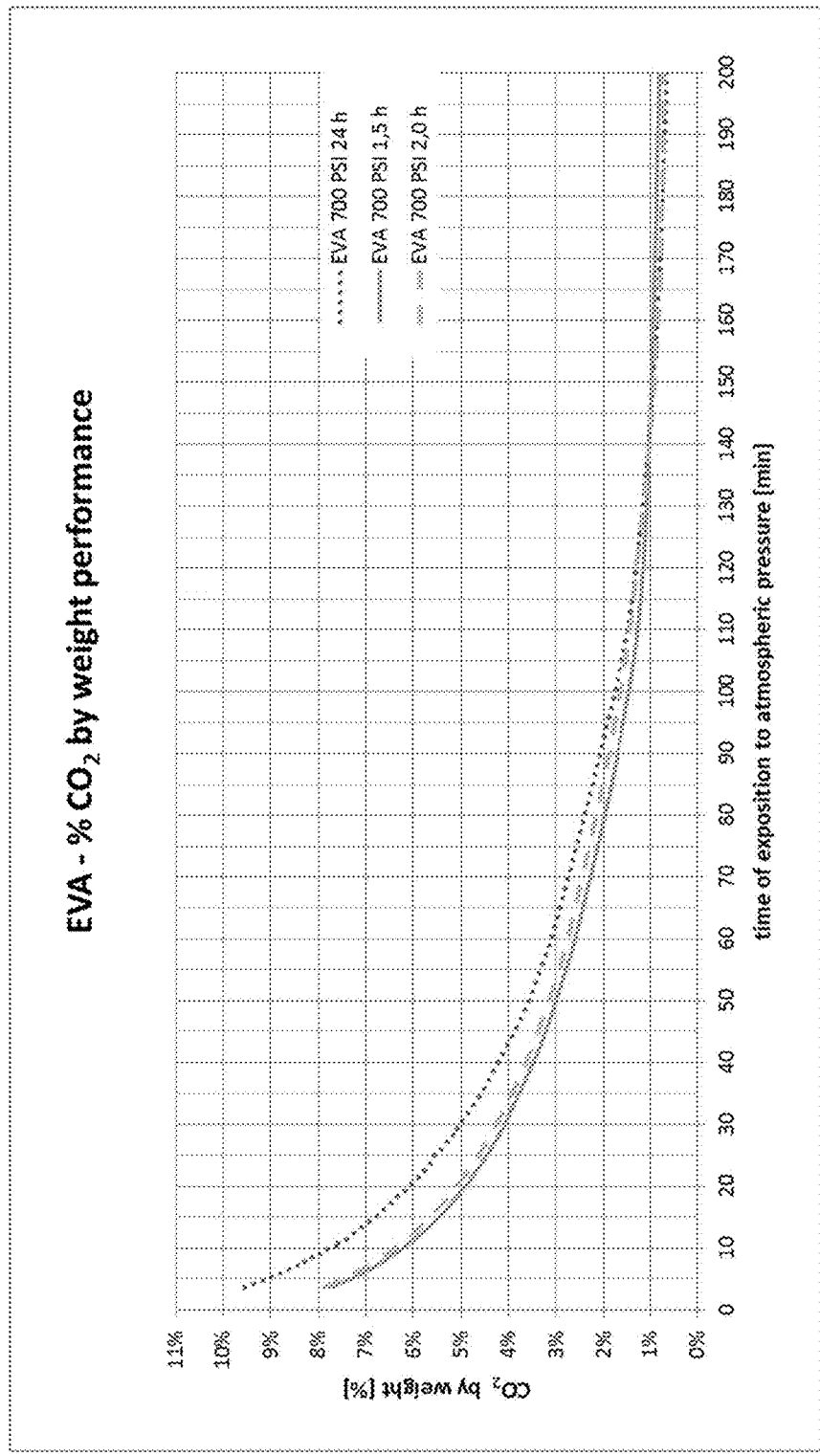
FIG. 1: Shows the % $CO_2$ content by weight in EVA as a function of time of exposition to the atmospheric pressure before injection for different gas impregnation times of example 1

The present invention is related to a low temperature process which comprises several steps to integrate polymeric foam with polymeric bodies to obtain a final body with improved properties, said process being carried out at low temperatures to avoid deformations in the polymeric body which compromise the functionality and other properties of the final structure. The process comprises the steps of selecting the polymeric materials which guarantee the adhesion between them, the processability, the reutilization and the recyclability; impregnating the material to be foamed with a gas; generating the foam; and, integrating the foam with the polymeric bodies.

Another characteristic of the process of the present invention is based on the reduction of costs through the use of elements known in the state of the art and commonly used in polymer processing, and the fact that both the polymeric material to be foamed and the material of the polymeric body are compatible with respect to their recyclability, such that, after the final structure is used many times, it may be recycled to obtain other later bodies without the need to use new material, helping thereby to reduce the environmental impact.

The process comprises the steps of:
Selecting the material or materials for the polymeric bodies. This selection is made based on the requirements for the application of the final structure.
Selecting the polymeric material to be foamed, keeping in mind as selection criteria that the crystal melting temperature in the case of a material that crystallizes, or the glass transition temperature in the case of a material that does not crystallize, is lower than the temperature at which residual stresses are liberated in the polymeric body.

Providing at least one polymeric body with any desired shape.

Providing the material to be foamed in a solid state, that is, at a temperature in the range from the glass transition temperature to the crystal melting temperature for a material that crystallizes, or below the glass transition temperature for a material that does not crystallize.

Contacting the polymeric material to be foamed with gas at a pressure greater than atmospheric pressure for a sufficient time such that the material to be foamed incorporates at least 0.1% gas by weight.

Exposing the polymeric material to be foamed to a pressure lower than the pressure used in the previous step for a sufficient time such that the gas loss rate does not affect the stability of the following steps. The time cannot be excessive, otherwise there will not be sufficient gas impregnated in the polymeric material, affecting the foaming capacity in the following steps.

Exposing the polymeric material to be foamed to a pressure greater than that used in the previous step and a temperature greater than the crystal melting temperature for a material that crystallizes, or greater than the glass transition temperature for a material that does not crystallize, and lower than the temperature at which residual stresses are liberated from the at least one polymeric body.

Contacting the foamed polymeric material with that at least one polymeric body at a pressure lower than that used in the previous step. When the pressure is lowered, the impregnated gas is liberated permitting foaming.

In a preferred embodiment of the present invention, the materials of the polymeric foam and the at least one polymeric body are compatible with the object of permitting recycling, since it is necessary to protect the environment and avoid requiring new or virgin materials every time a new structure is created, but rather, it is desirable to use materials which can be reutilized multiple times while still conserving the properties of the material. Additionally, the polymeric material to be foamed and the material of the at least one polymeric body should be compatible with object of permitting adhesion between them. In this way, the stability and permanent integration of the composite structure of the at least one polymeric body and the polymeric foam are guaranteed.

In a preferred embodiment of the present invention, the material to be foamed is selected from the group consisting of ethylene-vinyl acetate (EVA), ethylene-butylacrylate (EBA), low density polyethylene (LDPE), linear low density polyethylene (LLDPE), high density polyethylene (HDPE), medium density polyethylene (MDPE), polypropylene (PP), ionomers, or blends which contain one or more of the aforementioned. Additionally, nucleating agents which aid the foaming process may be used.

In a preferred embodiment of the invention, the step of submitting the polymeric material to be foamed to a gas at an elevated pressure is carried out using a gas that contains carbon dioxide ($CO_2$) and/or nitrogen ($N_2$).

In a further preferred embodiment of the invention, the process of integrating the polymeric materials (of the body and of the foam) is carried out through any known method of integrating materials, preferably by extrusion, injection molding, or any other related polymer transformation process.

In another preferred embodiment of the invention, the step of exposing the polymeric material to be foamed to a pressure lower than the pressure used in the previous step for a sufficient time such that the gas loss rate does not affect the stability of the following steps is performed at atmospheric pressure for a time between 0 and 90 minutes, preferably between 20 min and 70 min, offering a broad processing window for an industrial-scale use of the invention.

Finally, in an alternate embodiment of the invention, the process of integrating the materials defined here is carried out in such a way that the steps of providing of the at least one polymeric body and the contacting of said body with the polymeric foam are carried out simultaneously after having completed the other previously defined steps. Specific examples of this embodiment include the co-extrusion of the foamed material and the un-foamed body or bodies, extrusion lamination of the foamed material to other films made of different polymers, extrusion coating, etc.

The present invention will be further defined by the following examples which are illustrative only and do not intend to limit the scope of the invention defined in the appended claims. Further modifications, embodiments and variations of the invention will be evident for those skilled in the art without departing from the scope of the present invention.

EXAMPLES

The following examples were made using conventional injection and extrusion processing equipment, such as those known in the state of the art without the need of using special molds for the process of integrating the foam to the polymeric body.

Example 1

Incorporation of a Semi-Crystalline Polymeric Material in a Polymeric Body by Low Temperature and Low Pressure Injection A polymeric body made with a high density polyethylene (HDPE) type polymer was provided, which has a crystal melting temperature between 130° C. and 139° C., with a melt index (190° C.-2.16 kg) between 10 g/10 min and 20 g/10 min and a density at room temperature between 0.94 g/cm$^3$ and 0.96 g/cm$^3$ and with a residual stress release temperature between 110° C. and 130° C.

The above mentioned polymeric body was integrated with a polymeric foam in order to reduce its weight and to improve its impact properties without affecting the recyclability or the dimension characteristics by an injection process at low temperature and low pressure. To this end, a polymeric material to be foamed compatible with the polymeric body is provided, which favors its adherence, having the following characteristics: Ethylene vinyl acetate (EVA) type polymer, with Vinyl Acetate content between 15% and 25%, and crystal melting temperature between 75° C. and 85° C. and melt index (190° C.-2.16 kg) between 4 g/10 min and 12 g/10 min and a density at room temperature of 0.95 g/cm$^3$.

The polymeric material to be foamed is previously conditioned and contacted with carbon dioxide ($CO_2$) at a pressure between 400 psi and 700 psi for a time greater than one hour at room temperature, wherein it is impregnated by the $CO_2$. During this period, the material absorbs between 6% and 10% wt. of $CO_2$. The use of different impregnation times does not significantly affect the desorption behavior, as shown in FIG. 1, which shows desorption curves after contacting the polymeric material with $CO_2$ for 1.5, 3 and 24 hours.

Figure 2:
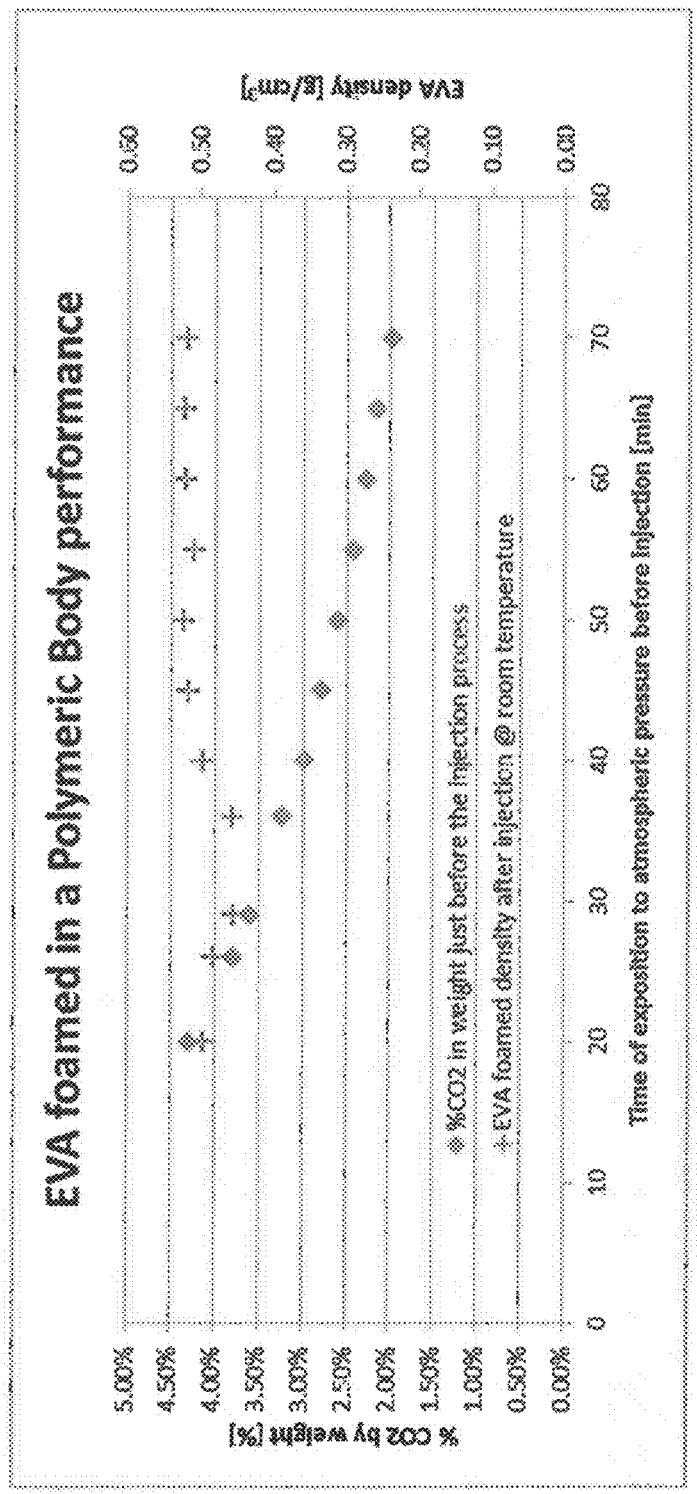
FIG. 2: Shows the injected EVA foamed density and % $CO_2$ content by weight just before the injection process vs time of exposition to atmospheric pressure, before injection of example 1

Once the step of contacting the polymeric material with $CO_2$ has been finished, the material is exposed to the environmental conditions. The percentage of $CO_2$ in weight in the polymer decreases from the time the material is exposed to the environmental conditions. The step of injecting the impregnated polymeric material can be carried out when the material reaches a $CO_2$ percentage between 0.5% and 8% wt., preferable 0.5% and 4% wt., more preferably between 0.8% and 2.5% wt. The above values of content of $CO_2$ are reached if the injection is made immediately after the material was exposed to the atmospheric pressure, preferably forty (40) minutes after and up to time so long as about seventy (70) minutes after the material was exposed to the atmospheric pressure, keeping thereby a stable foaming density. As shown in FIG. 2, densities lower than 0.5 g/cm$^3$ with concentrations greater than 3.5% wt. of $CO_2$ are reached, and the density stabilizes at a value close to 0.52 g/cm$^3$ with a standard deviation of 0.005 g/cm$^3$ when the atmospheric pressure exposition time before the injection process is greater than forty (40) minutes keeping the stability with times of up to about seventy (70) minutes, which allows to have an important processability window.

Figure 3:
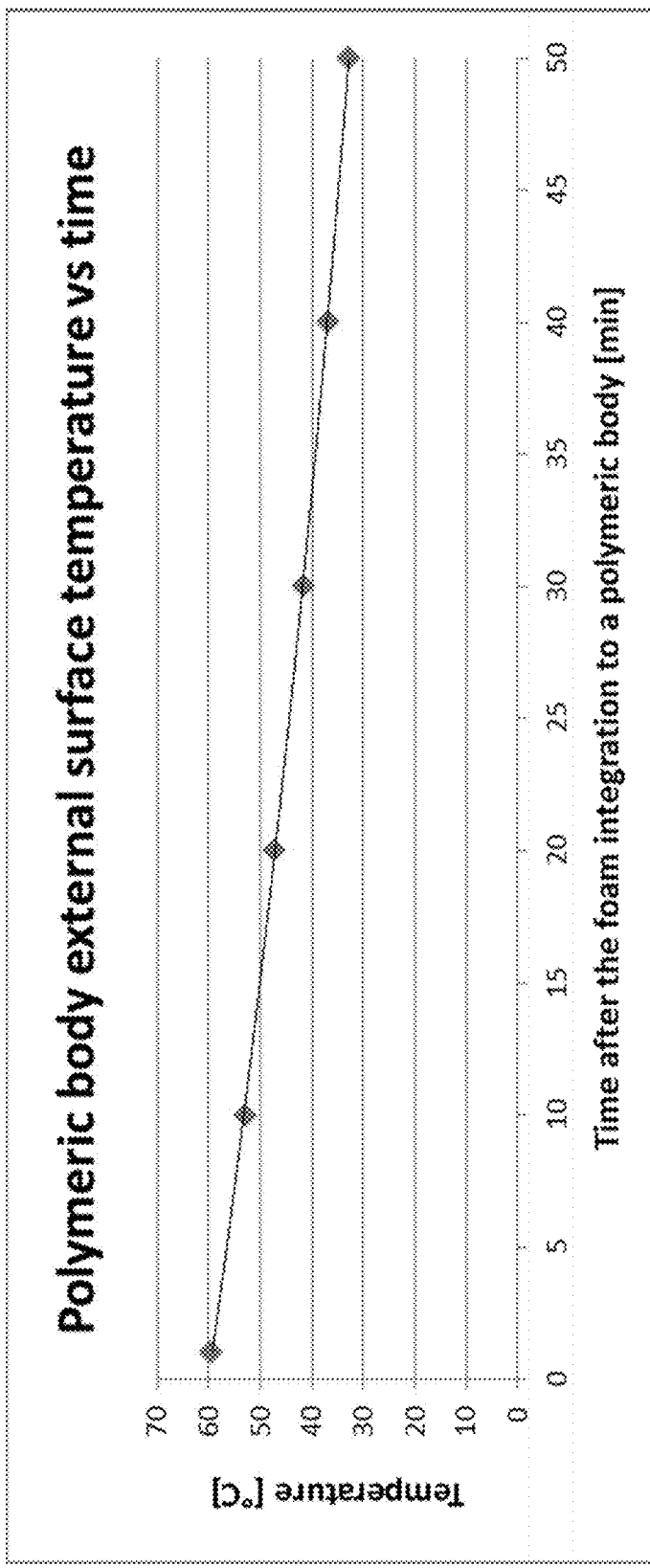
FIG. 3: Shows the external polymeric body surface temperature vs time after the foam integration to a polymeric body of example 1

During the injection process the material is pressurized and heated allowing the foaming process after the material is injected. The foaming and integration by injection process between the polymeric material impregnated with $CO_2$ and the polymeric body is performed at low temperature, with melting temperature between 70° C. and 105° C., preferably between 70° C. and 95° C. and more preferably between 80° C. and 90° C. ensuring that the foamed material is below the residual stress release temperature of the polymeric body (110° C. to 130° C.), avoiding thereby deformations induced by stress relaxation by temperature in the polymeric body. When integrating the polymeric foam by the injection process at low temperature, the temperature of the polymeric body is increased up to 60° C. progressively reducing until reaching again the room temperature in a period close to one hour after the injection, as can be seen in FIG. 3.

Figure 4:
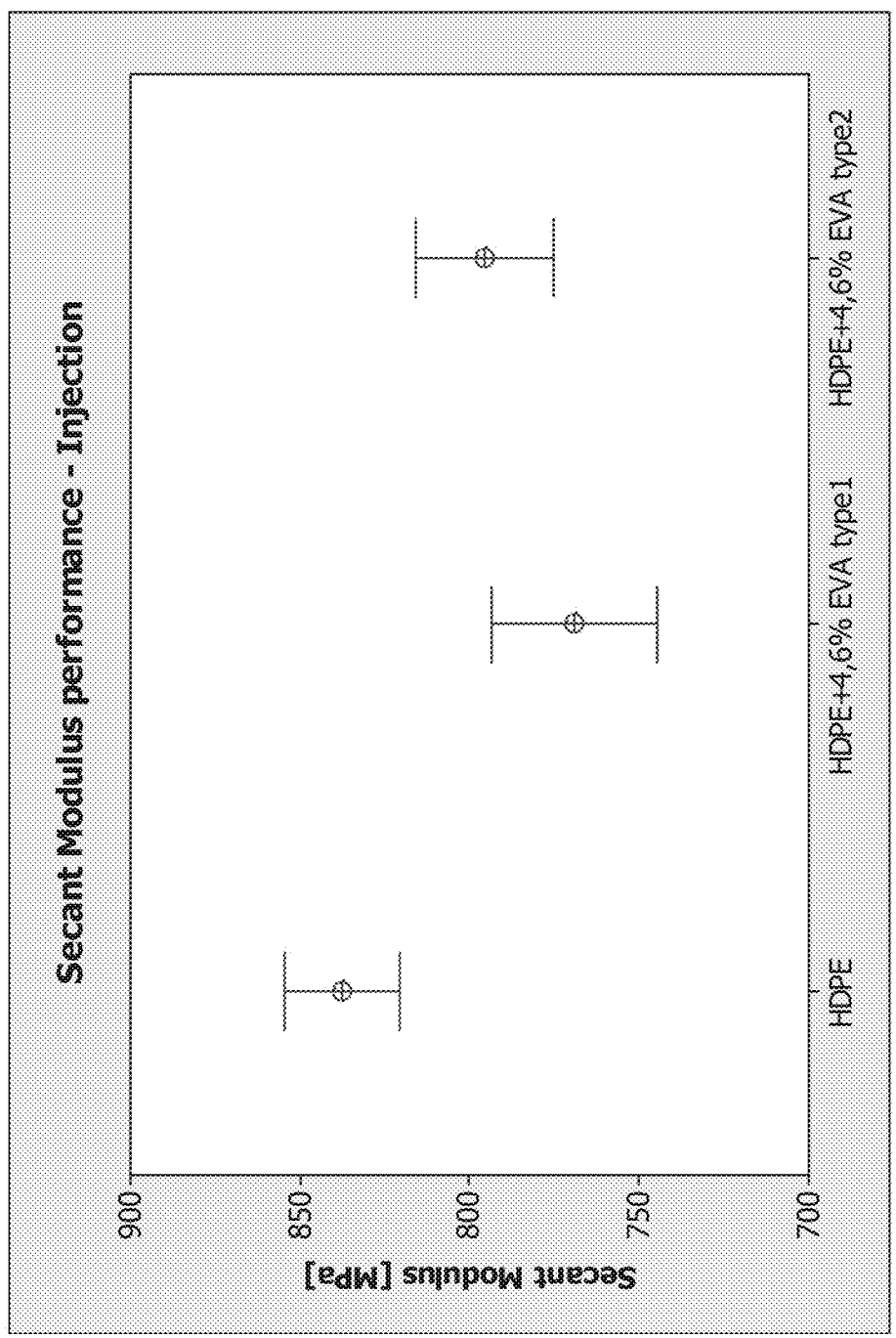
FIG. 4: Shows the charpy notched impact strength and Secant modulus of pure HDPE, HDPE with 4.6% EVA type 1 and HDPE with 4.6% EVA type 2 of example 1.
Figure 4:
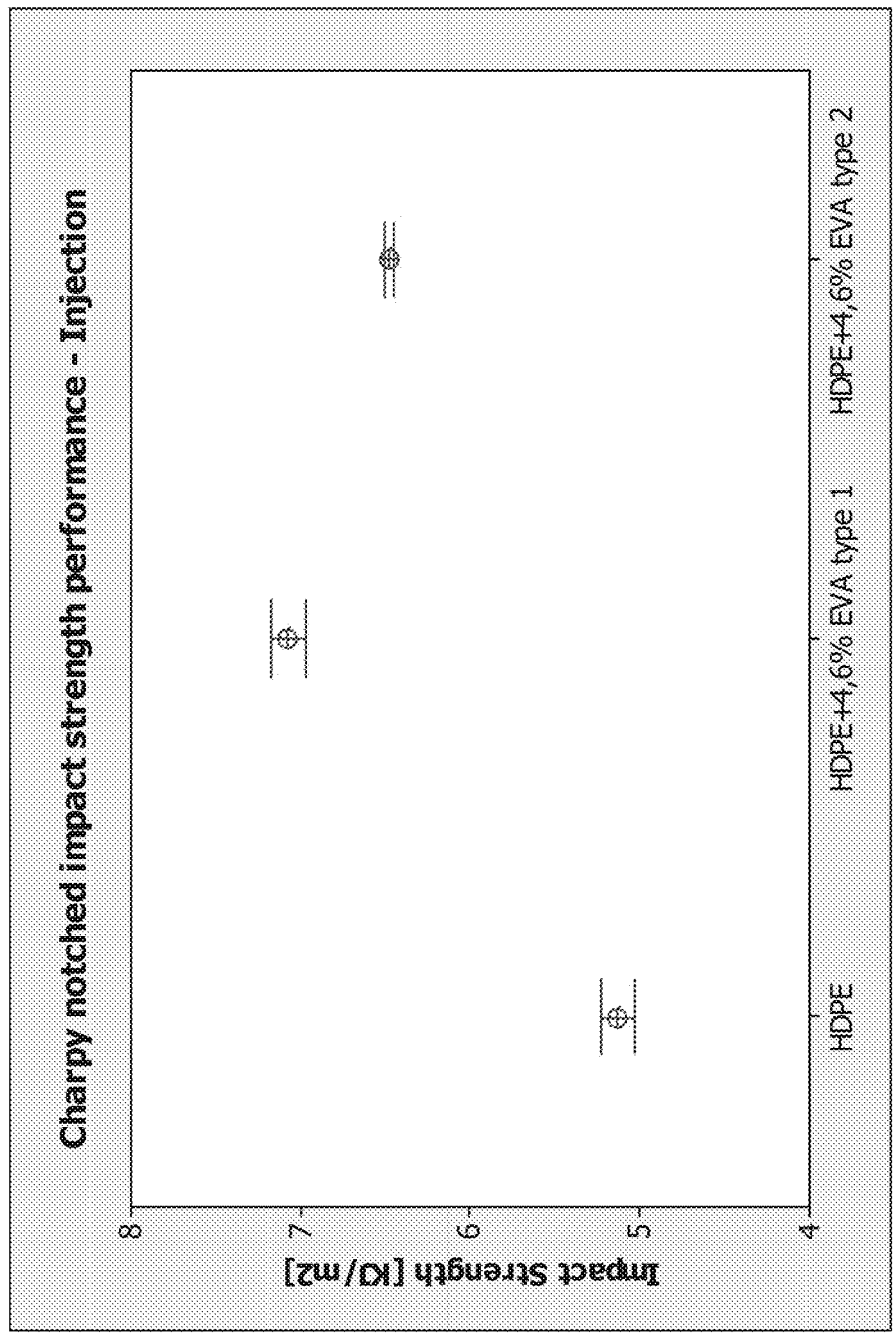

The polymeric body integrated with the polymeric foam can be recycled to generate a new polymeric body for the same application. The recycled material can be totally or partially incorporated into the new polymeric body. To show the above, successive cycles of recycling and incorporation were made in a 25% wt. of said recycled material to each cycle for the manufacture of a new polymeric body, until reaching a stable EVA content in the polymeric body, which corresponds to 4.6% in weight after four (4) recycling cycles. The properties obtained do not show significant detriment in the mechanical properties due to the EVA content, since only a decrease of 8.2% in the secant modulus with EVA type 1 (average 769.0 MPa and standard deviation of 19.78 MPa) and 5.0% with EVA type 2 (average 795.8 MPa and standard deviation of 16.48 Mpa) with respect to the property of the polymeric body material with no recycling or EVA content (average 837.4 MPa and standard deviation of 13.72 MPa); on the other hand, it can be observed a significant improvement in the impact resistance properties, since values 38% greater were obtained with a EVA type 1 (average 7.1 KJ/m$^2$ and standard deviation of 0.083 KJ/m$^2$) and 26% greater with EVA type 2 (average 6.48 KJ/m$^2$ and standard deviation of 0.023 KJ/m$^2$) with respect to the property of the polymeric body material with no recycling or EVA content (average 5.1 KJ/m$^2$ and standard deviation of 0.079 KJ/m$^2$), as shown in FIG. 4.

For this application, other polymers can be considered, such as: ionomers with crystal melting temperatures between 70° C. and 100° C., or ethyl butyl acetate (EBA) with crystal melting temperatures between 80° C. and 100° C. Due to the low crystal melting temperatures and compatibility with the high density polyethylene, similar results are expected. The use of nucleating agents with the polymeric material to be foamed can also be considered, wherein it is expected an improvement in the uniformity of cell size and therefore, a better performance in structural properties.

Similarly, the afore-mentioned example can be extrapolated to other applications in which the characteristics are required to be improved, such as: weight reduction, impact resistance, thermal insulation or acoustical insulation of a polymeric body wherein the dimensional or geometric characteristics, as well as its recyclability properties, are not affected.

Example 2

Incorporation by Low Pressure Injection of Polyethylene and Polypropylene Foams in a Polymeric Body In order to assess the performance of the present invention in other materials, two semi-crystalline polymers are provide as materials to be foamed, one of which is high density polyethylene (HDPE) type, which has a crystal melting temperature between 130° C. and 139° C., with a melt index (190° C.-2.16 kg) between 10 g/10 min and 20 g/10 min and a density at room temperature between 0.94 g/cm$^3$ and 0.96 g/cm$^3$ and the other material is polypropylene (PP) type, which has a crystal melting temperature between 165° C. and 170° C., with a melt index (230° C.-2.16 kg) between 4 g/10 min and 10 g/10 min and a density at room temperature between 0.90 g/cm$^3$ and 0.92 g/cm$^3$. A good performance with other polymeric foam materials is expected, such as low density polyethylene (LDPE), medium density polyethylene (MDPE), linear low density polyethylene (LLDPE) and polypropylene copolymers (PP-C), since these polymers exhibit better values of melt strength compared to high density polyethylene (HDPE). The above materials can be integrated to high density polyethylene (HDPE), polypropylene (PP), polycarbonate (PC), polyethylene terephthalate (PET), polyamide (PA), poly oxy methylene (POM), polyether ether ketone (PEEK) type polymeric bodies, among other materials which residual stress release temperature is above the injection temperature of the polymeric foam.

Both PP and HDPE are placed in contact with $CO_2$ at a pressure between 400 PSI and 700 PSI for a period of time between 2 and 4 hours at room temperature, wherein they absorb between 1% and 2% wt. of $CO_2$. After such period, the material is exposed to the atmospheric pressure. The $CO_2$ content by weight in the polymer decreases from this moment. The injection process of the impregnated polymeric material is made ten (10) minutes after the material was exposed to the atmospheric pressure, preferably twenty (20) minutes after. The content of $CO_2$ by weight for the injection process is between 0.5% and 1% wt. for PE, preferably between 0.5% and 1% and for PP is between 0.5% and 2% wt., preferably between 0.5% and 1% wt.

Figure 5:
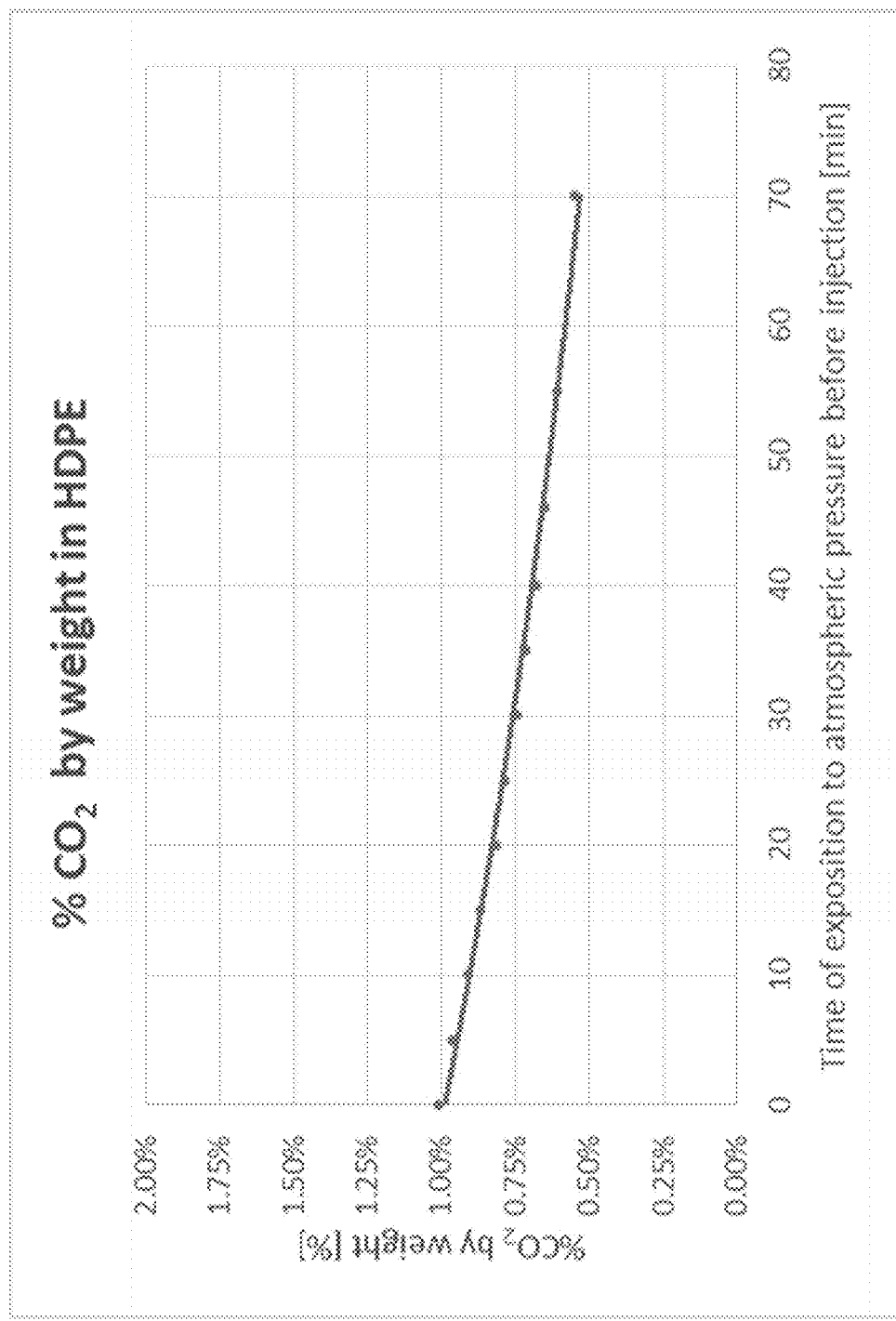
FIG. 5: Shows the % $CO_2$ content by weight in HDPE and PP as a function of time of exposition to the atmospheric pressure before injection of example 2.
Figure 5:
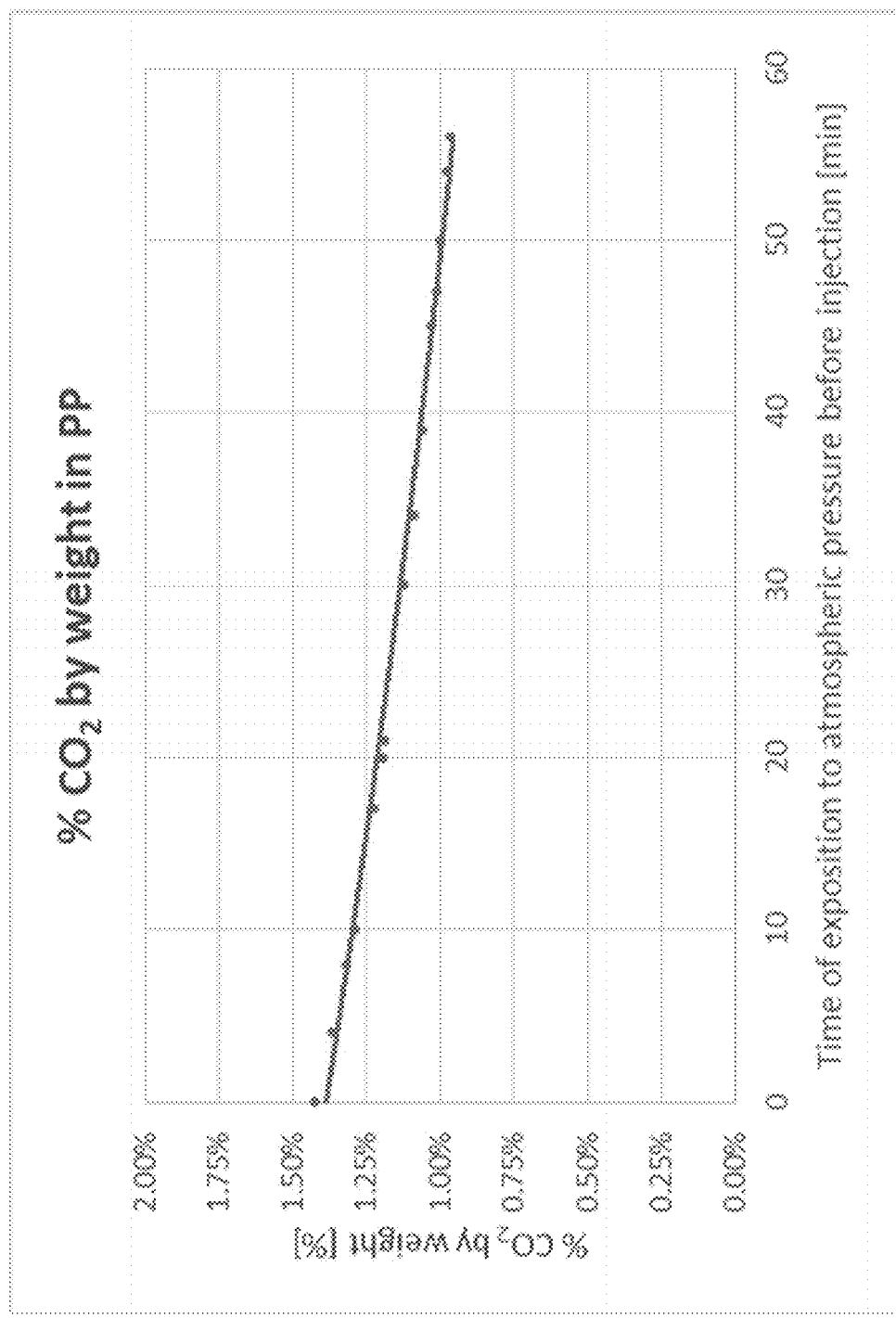

In FIG. 5, a decrease in the content of $CO_2$ by weight can be seen once the material is exposed to the atmospheric pressure. After 40 minutes, the content is around 0.5% wt. for HDPE and 1.0% wt. for PP.

Figure 6:
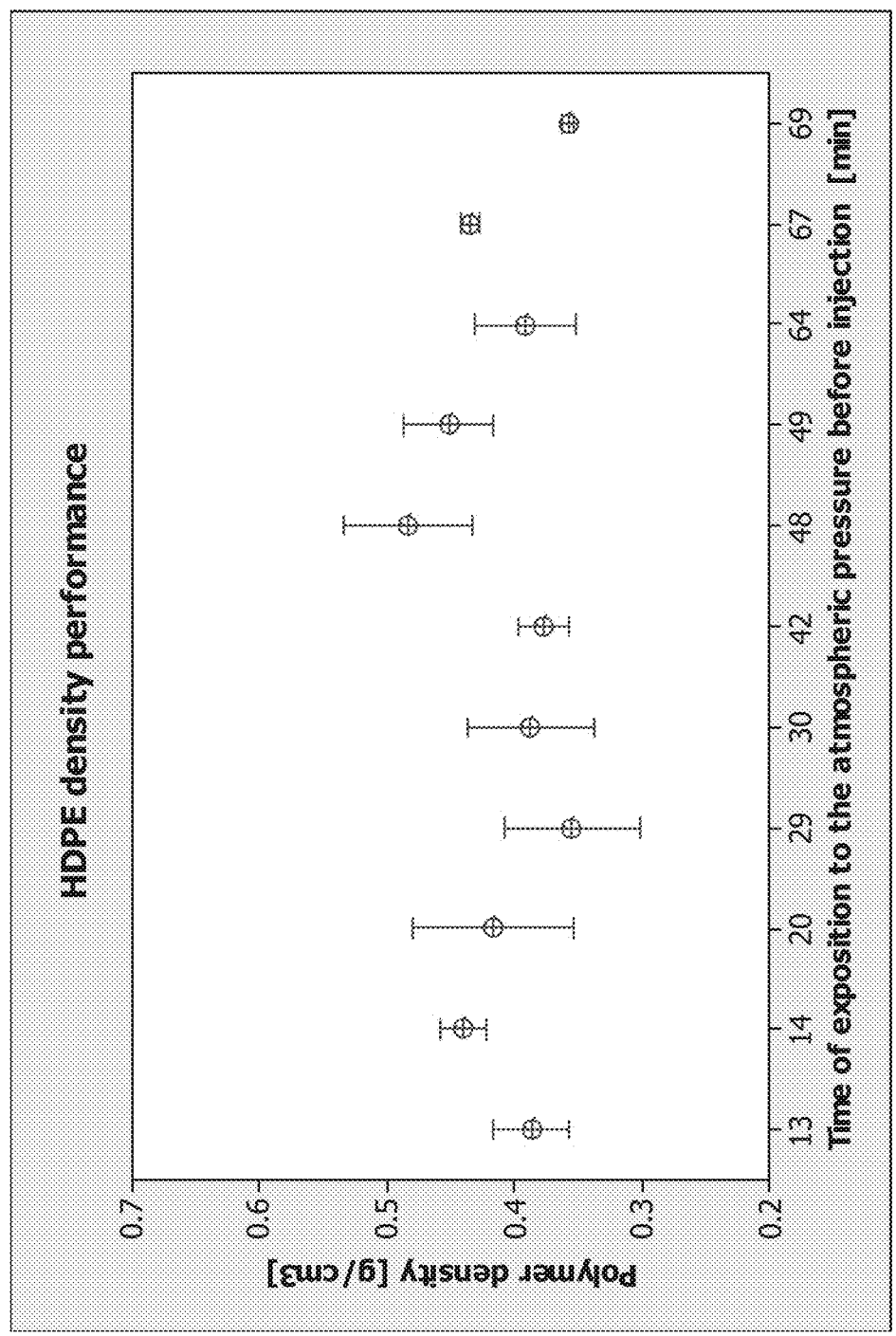
FIG. 6: Shows the HDPE and PP foamed density after injection vs time of exposition to the atmospheric pressure before injection of example 2
Figure 6:
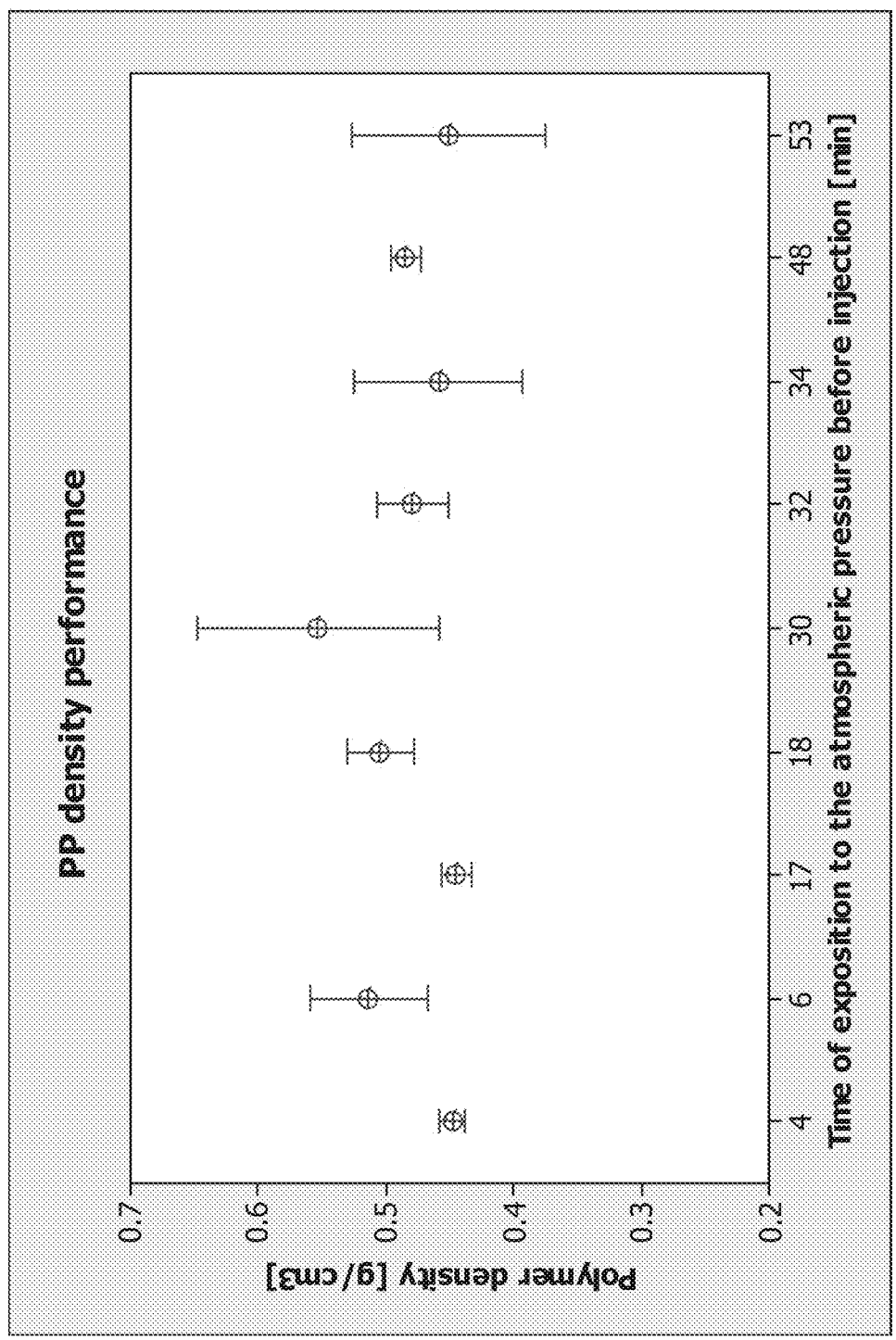

During the injection process the material is pressurized and heated allowing the foaming process after the material is injected. The integration process by injection of the polymeric material impregnated with $CO_2$ occurs at a melting point between 170° C. and 200° C. for HDPE and between 180° C. and 210° C. for PP. With these processing conditions, densities for the polymeric material at room temperatures for HDPE between 0.38 g/cm$^3$ and 0.47 g/cm$^3$ are obtained, which correspond to a reduction in density of 57% with respect to un-foamed HDPE, and for PP densities between 0.44 g/cm$^3$ and 0.55 g/cm$^3$ are obtained, which correspond to a reduction in density of 46% with respect to un-foamed PP. The values of density remain stable for material exposition times to the atmospheric pressure, before the injection process, greater than 60 minutes, providing abroad processability window, as shown in FIG. 6.

Figure 7:
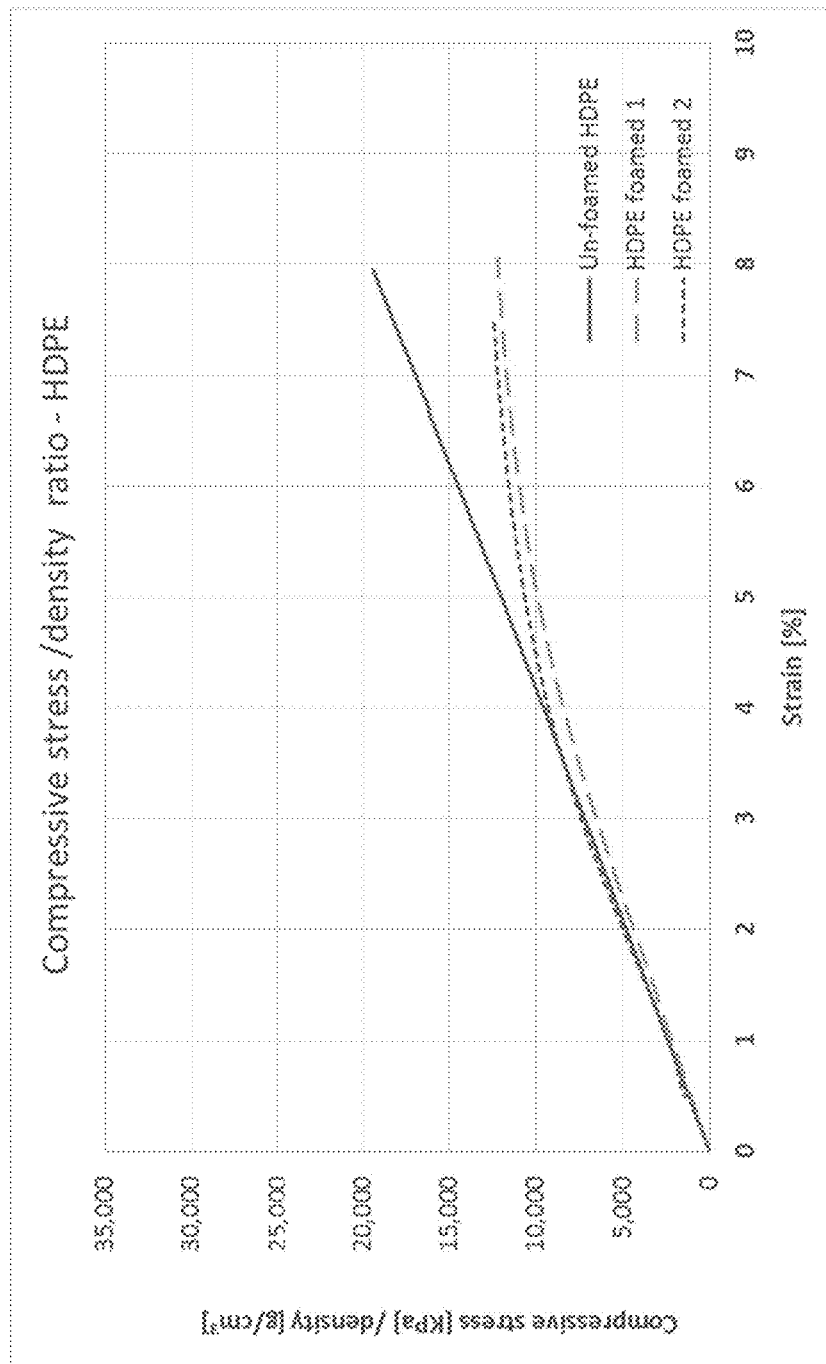
FIG. 7: Shows the comparison of HDPE and PP Compressive stress/density ratio after injection for un-foamed and foamed materials of example 2
Figure 7:
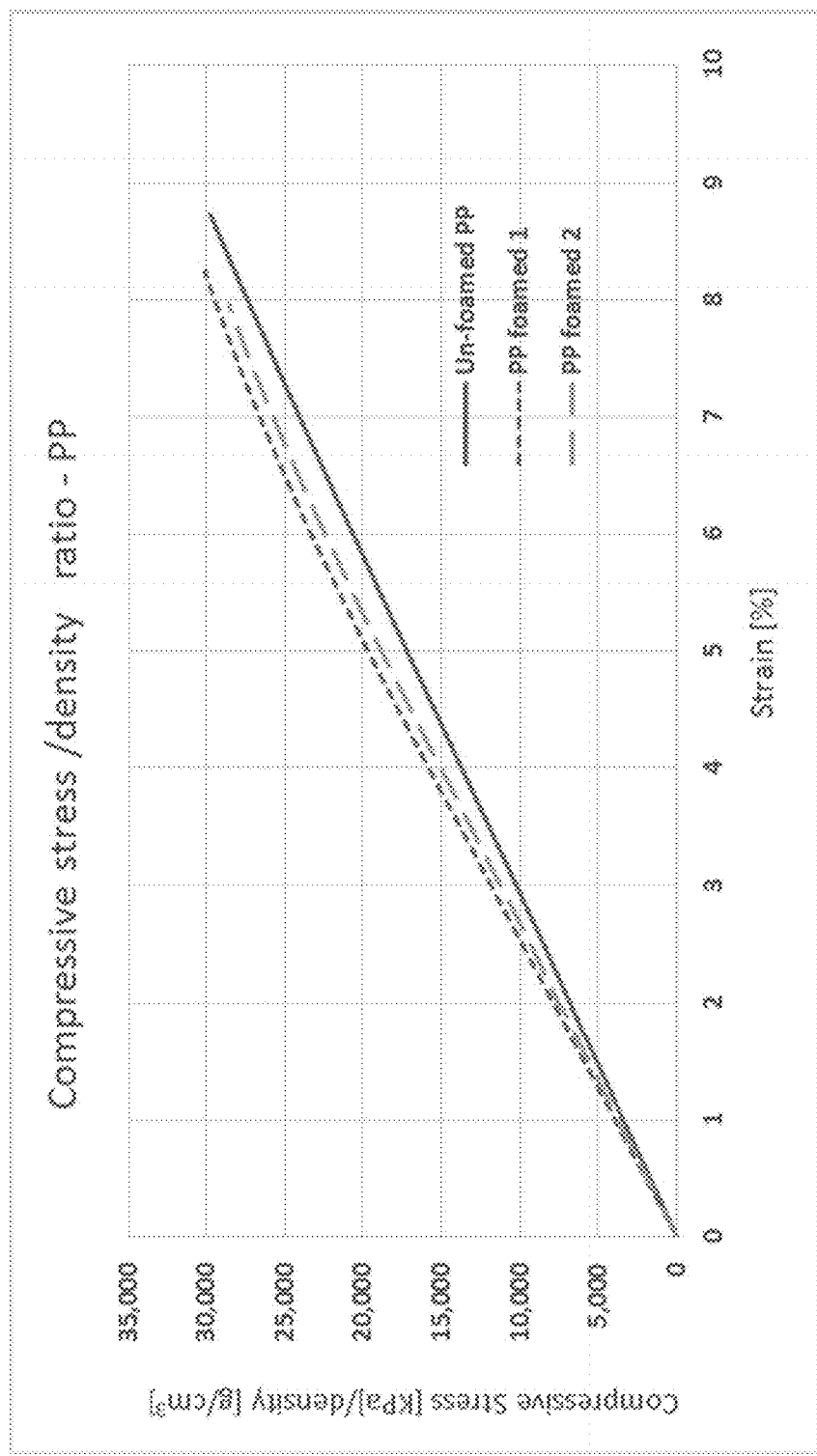

In terms of properties, the ratio between the compressive stress and density as a normalized indicator of stiffness (KPa/g/cm$^3$), shows a comparable behavior between the foamed polymeric materials and the un-foamed polymeric materials in compressive strains between 0% and 4% for HDPE and between 0% and 8% for PP as shown in FIG. 7. Such values of deformation comprise the range of normal use conditions for a polymeric part. This characteristic is highly desirable in structural foams, such as for example in the case of a plate, the expected deflection by effects of its own weight will be about the same for the un-foamed material to the foamed material.

Within the possible applications for the technology described in the low pressure injection process, are included those wherein it is required to reduce weight, improve the impact resistance, thermal insulation, sound insulation, filling of cavities, etc.

Example 3

Integration of a Polymeric Foam to a Polymeric Body by Extrusion Process

In other particular application, by a transformation process by extrusion, two semi-crystalline polymers are provided as materials to be foamed, one of which is low density polyethylene (LDPE) type, which has a crystal melting temperature between 120° C. and 130° C., with a melt index (190° C.-2.16 kg) between 2 g/10 min and 10 g/10 min and a density at room temperature between 0.91 g/cm$^3$ and 0.94 g/cm$^3$ and another material of polypropylene (PP) type, which has a crystal melting temperature between 165° C. and 170° C., with a melt index (230° C.-2.16 kg) between 4 g/10 min and 10 g/10 min and a density at room temperature between 0.90 g/cm$^3$ and 0.92 g/cm$^3$. These foamed materials can be integrated to a polymeric body which material can be in the types of high density polyethylene (HDPE), polypropylene (PP), polycarbonate (PC), polyethylene terephthalate (PET), polyamide (PA) among other materials which residual stress release temperatures are above the extrusion temperature of the polymeric foam. The integration can be carried out by processes of extrusion lamination, extrusion coating, co-extrusion, etc. Such integration between a polymeric body and an extruded polymeric foam is desirable in applications wherein it is required to reduce the density and weight, improving the performance of properties such as impact resistance, thermal insulation, acoustical insulation, etc.

Figure 8:
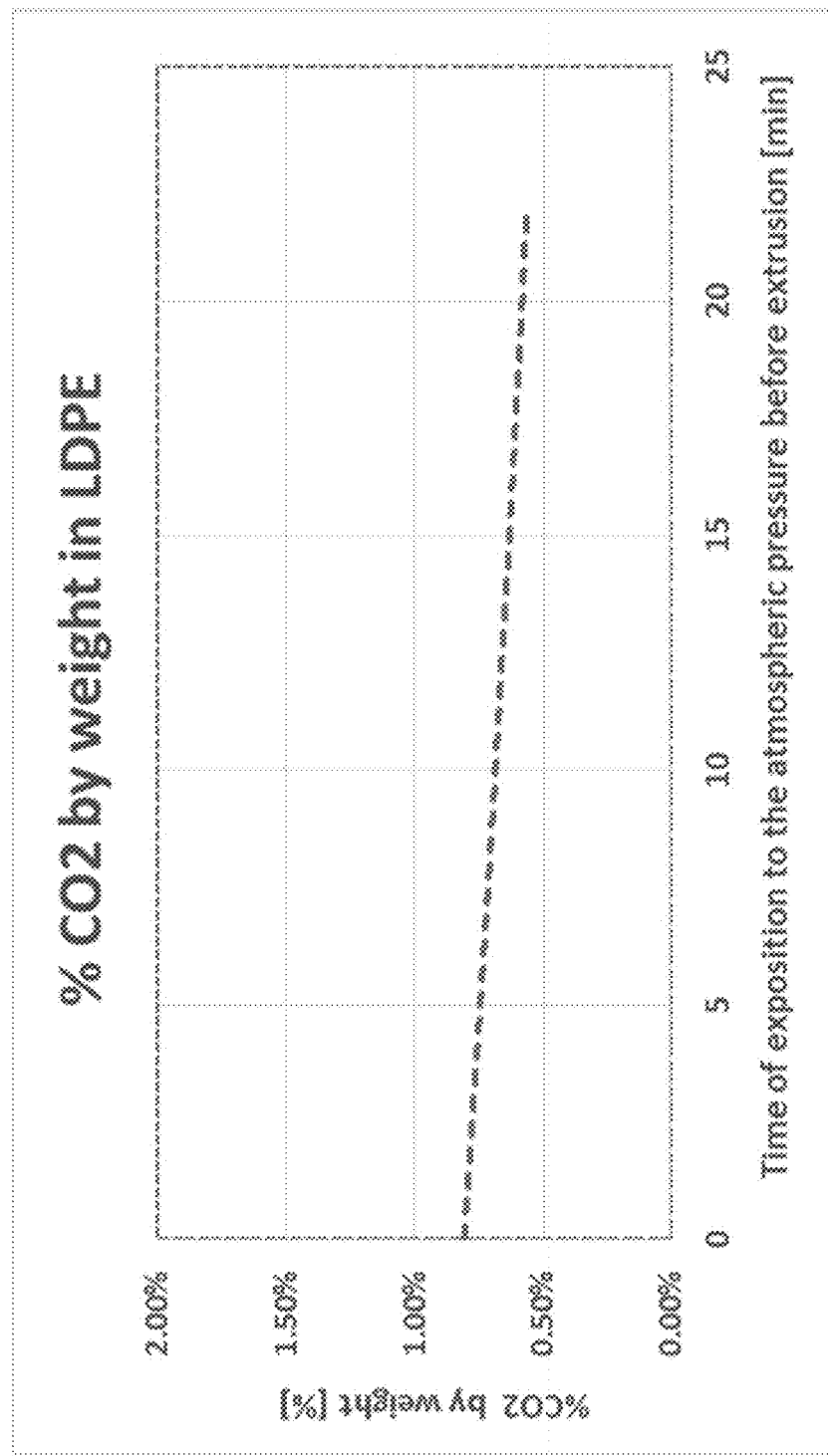
FIG. 8: Shows the % $CO_2$ content by weight in LDPE and PP as a function of time of exposition to the atmospheric pressure before extrusion of example 3
Figure 8:
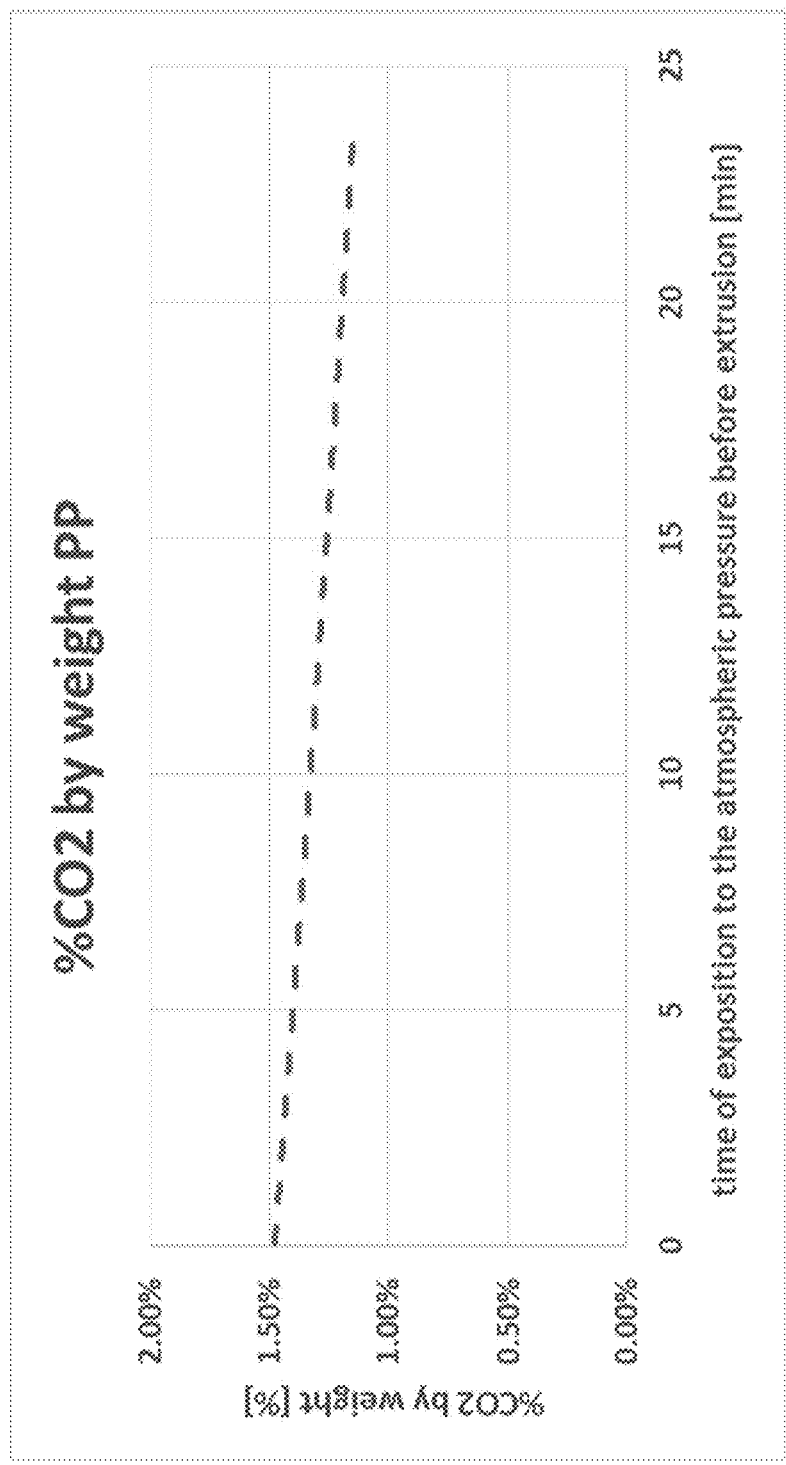

Both LDPE and PP are placed in contact with $CO_2$ at a pressure between 400 PSI and 700 PSI over a period of time between 2 and 4 hours at room temperature, wherein they absorb between 0.5% and 2% wt. of $CO_2$. After such period, the material is exposed to the atmospheric pressure. The percentage of $CO_2$ by weight in the polymer decreases from this moment. The extrusion process of the impregnated polymeric material begins five (5) minutes after the material was exposed to the atmospheric pressure. The percentage of content of $CO_2$ by weight for the extrusion process is between 0.5% and 1.5% wt. for LDPE, preferably between 0.5% and 1% wt. and for PP is between 0.5% and 2% wt., preferably between 0.5% and 1% wt., as shown in FIG. 8.

Figure 9:
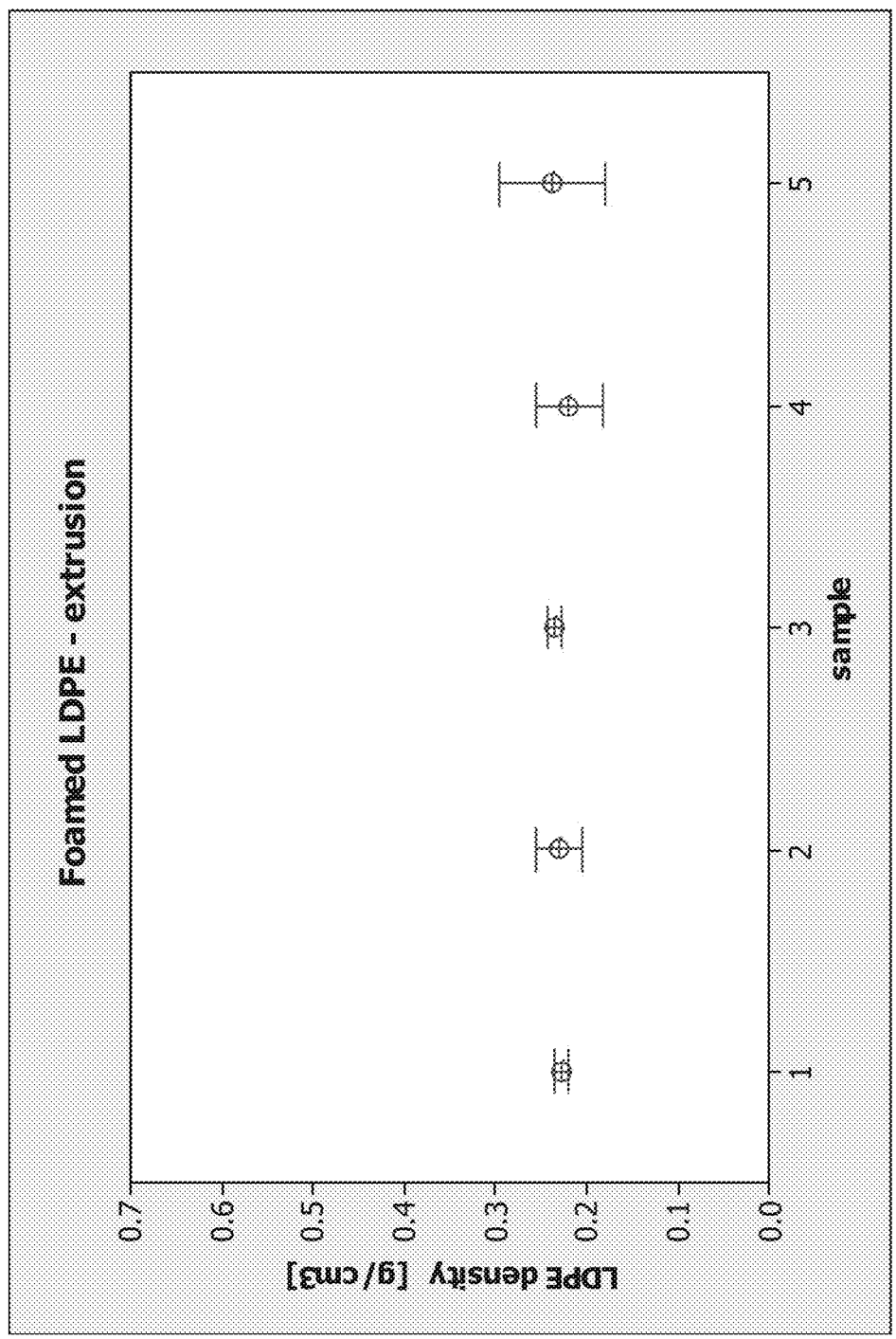
FIG. 9: Shows the LDPE and PP foamed density in extrusion for five samples of example 3
Figure 9:
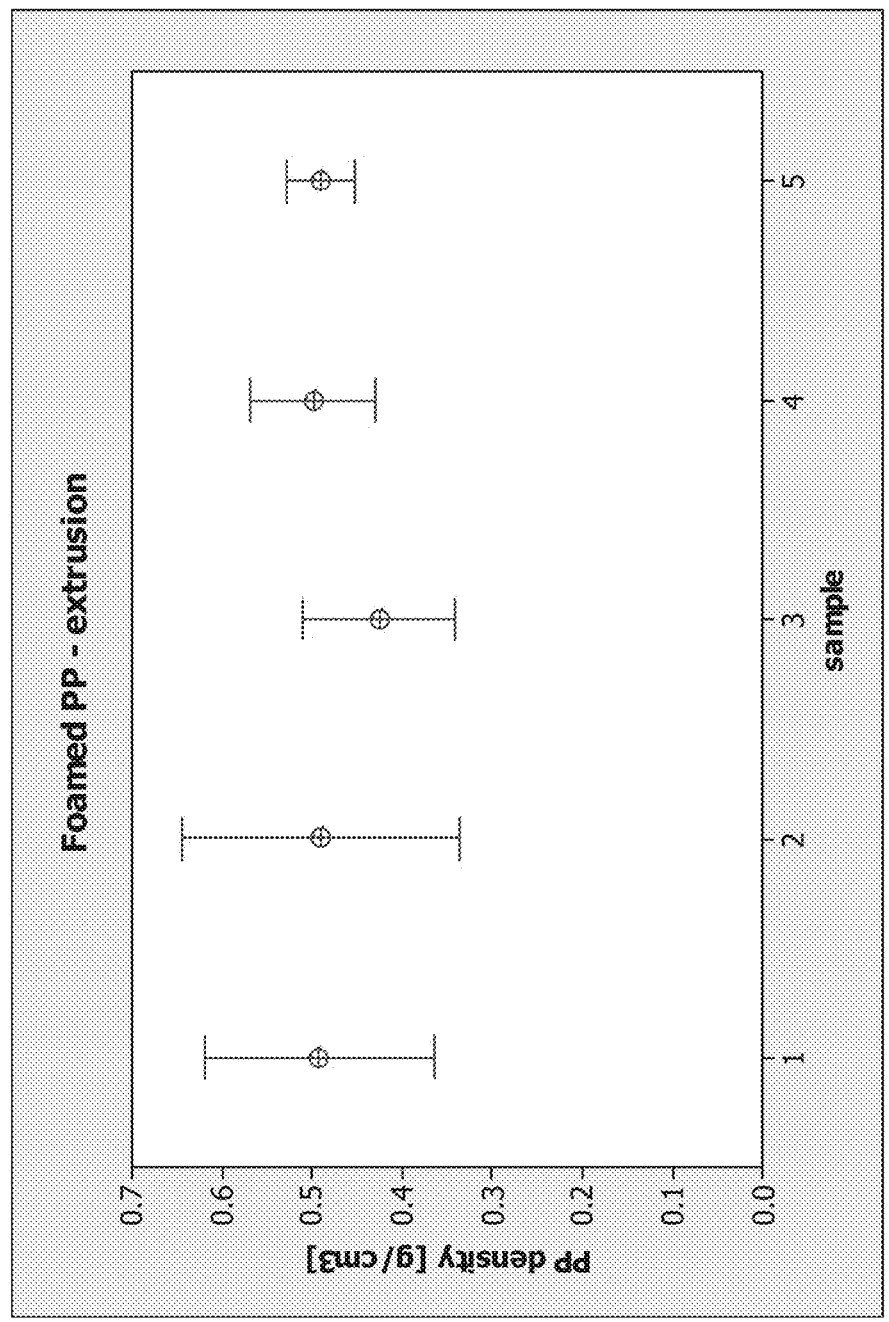

During the extrusion process the material is pressurized and heated allowing the foaming process and the integration with a polymeric body. The impregnated polymeric materials are provided to the extrusion process at a melting temperature between 170° C. and 200° C. for LDPE and between 180° C. and 210° C. for PP. With these processing conditions, densities of the polymeric material at room temperature for LDPE between 0.22 g/cm$^3$ and 0.24 g/cm$^3$ are obtained, which correspond to a reduction in density of 74% with respect to un-foamed LDPE, and for PP densities between 0.42 g/cm$^3$ and 0.50 g/cm$^3$ are obtained, which correspond to a reduction in density of 46% with respect to un-foamed PP, as can be seen in FIG. 9.

The invention claimed is:

1. A low temperature process for integrating a polymeric foam with at least one polymeric body which comprises the steps of:
    a. providing at least one polymeric body;
    b. providing a polymeric material to be foamed at a temperature between the glass transition temperature and the crystal melting temperature for a material that crystallizes, or at a temperature below the glass transition temperature for a material that does not crystallize, wherein the polymeric material to be foamed is different from the polymeric body but compatible with the polymeric body, and wherein the polymeric material to be foamed undergoes the following process:
       (i) contacting the polymeric material to be foamed with a gas at a pressure greater than atmospheric pressure until the polymeric material to be foamed incorporates at least 0.1% gas by weight,
       (ii) exposing the polymeric material to be foamed from step (i) to atmospheric pressure, and
       (iii) exposing the polymeric material to be foamed from step (ii) to a pressure greater than atmospheric pressure and a temperature greater than the crystal melting temperature of the polymeric material to be foamed of step b) for a material that crystallizes, or the glass transition temperature of the polymeric material to be foamed of step b) for a material that does not crystallize, and lower than the temperature that avoids polymeric body deformation to obtain a polymeric material impregnated with gas, wherein the temperature that avoids polymeric body deformation ranges between 110° C. and 130° C., and
    c. integrating the polymeric material impregnated with gas obtained from step b)(iii) with the at least one polymeric body at a pressure lower than the pressure used in step b)(iii), such that the impregnated gas is liberated permitting foaming of the polymeric material,
wherein,
    the polymeric material is selected from the group consisting of ethylene-vinyl acetate (EVA), ethylene-butyl acrylate (EBA), medium density polyethylene (MDPE), low density polyethylene(LDPE), linear low density polyethylene (LLDPE), copolymers of polypropylene (PP), ionomers, and mixtures thereof;

the polymeric body is selected from the group consisting of high density polyethylene (HDPE), polypropylene (PP), polycarbonate (PC), polyamide (PA), and polyethylene terephthalate (PET);

step b)(iii) and step c) are performed through extrusion, injection molding, or combinations thereof; and the time range in step b)(ii) is between 20 min and 70 minutes.

2. The process of claim 1, wherein the polymeric material to be foamed and the material of the at least one polymeric body are compatible with respect to their recyclability such that after a final structure is used many times the final structure may be recycled.

3. The process of claim 1, wherein the polymeric material to be foamed further includes nucleating agents.

4. The process of claim 1, wherein the gas contains carbon dioxide ($CO_2$) and/or nitrogen ($N_2$).

* * * * *